UNITED STATES PATENT OFFICE.

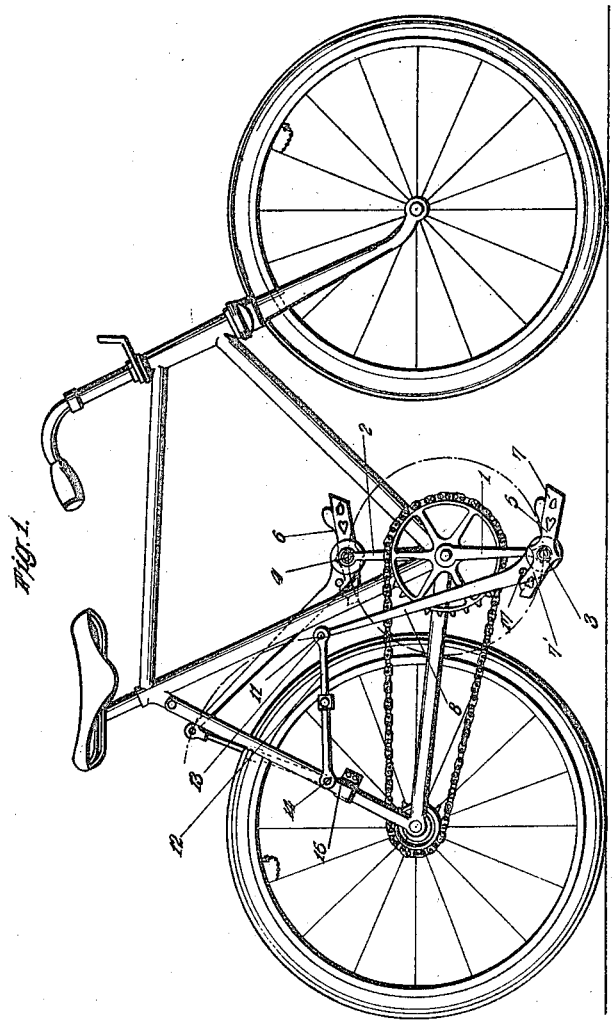

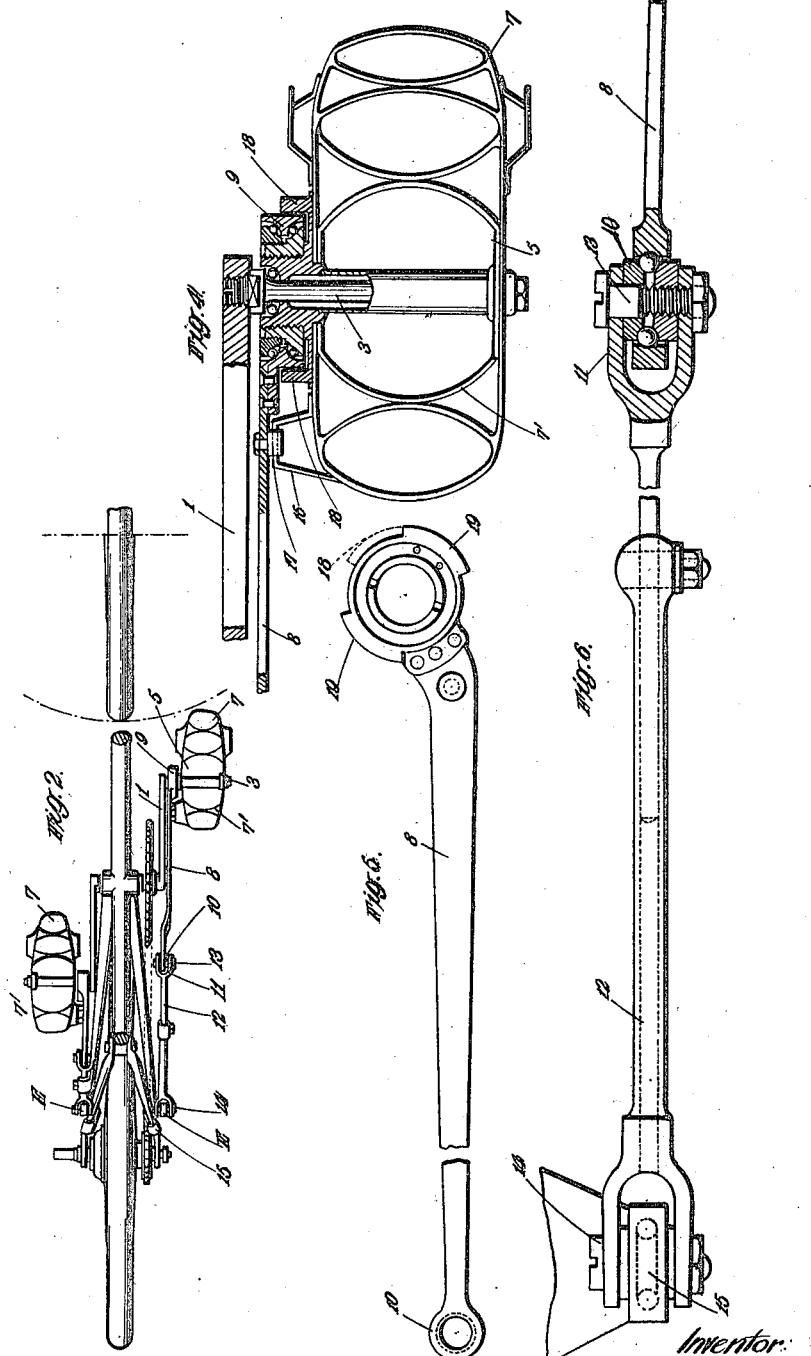

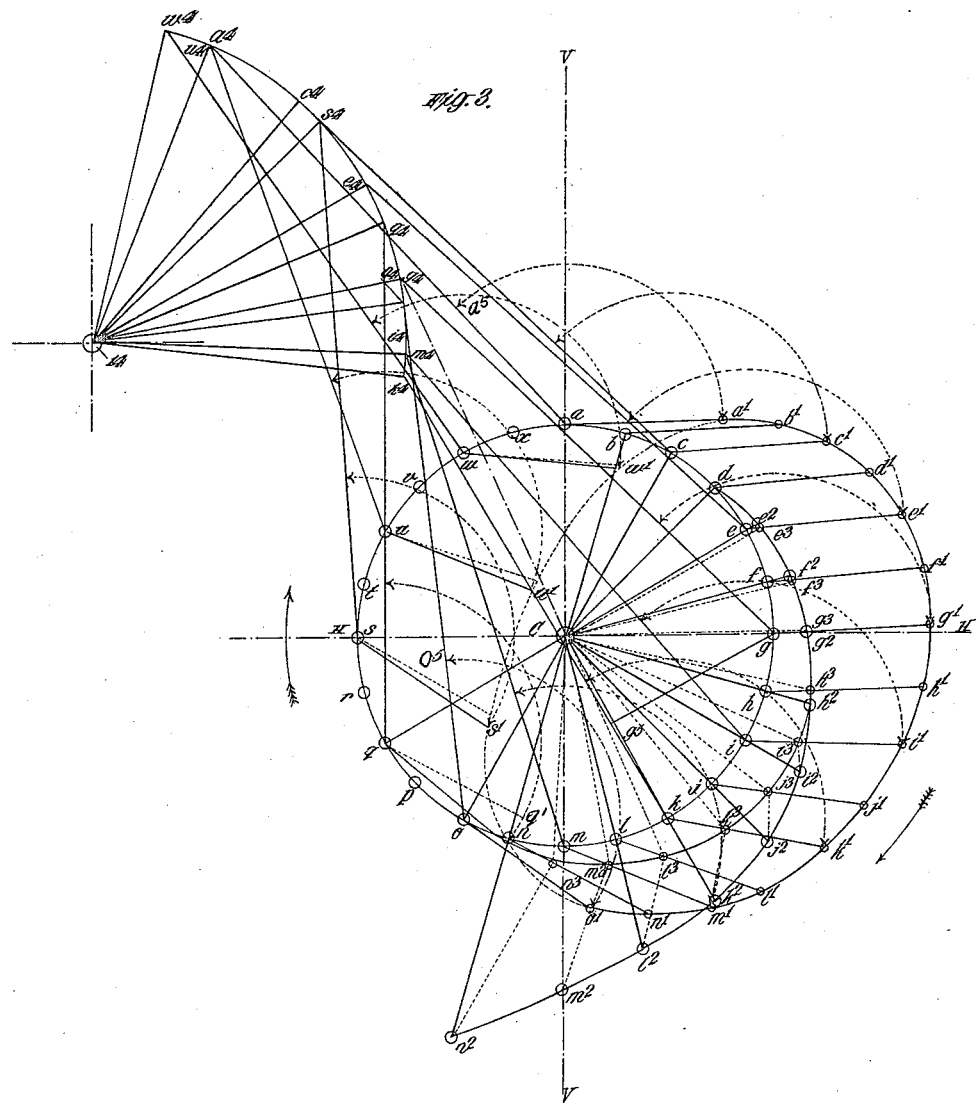

ARTHUR BOYD, OF WEST HARTLEPOOL, ENGLAND.

MECHANISM FOR PROPELLING VEHICLES.

1,323,004.  Specification of Letters Patent.  Patented Nov. 25, 1919.

Application filed February 4, 1919. Serial No. 274,994.

*To all whom it may concern:*

Be it known that I, ARTHUR BOYD, a subject of the King of Great Britain and Ireland, residing at 7 Queensberry avenue, West Hartlepool, in the county of Durham, England, have invented certain new and useful Improvements in Mechanism for Propelling Vehicles, of which the following is a specification.

This invention relates to mechanism for the propulsion of bicycles of the kind designed to enable increased leverage to be obtained during the driving stroke of each crank and also to enable an effective driving leverage to be obtained by each pedal as it passes through the top dead center before the leverage exerted by the other pedal becomes ineffective, the invention representing a further development of the mechanism described in United States Patent No. 1126947 granted to me.

The object of the present improvement is to simplify the mechanism and thus to reduce the weight and cost of production and to render the gear applicable to existing machines.

The mechanism of this invention comprises a driving crank and crank pin, a pedal elongated toward the front and mounted on the crank pin, a clutch rod or controlling rod having a considerably reduced angular velocity compared with that of the crank, journaled at one end upon the crank pin, the other end of the clutch rod being constrained by any suitable means to move in a predetermined path, and means for causing the pedal to engage with the clutch rod as the crank pin approaches its top center and makes a driving downward stroke, and to partially disengage therefrom during the upward idle stroke of the crank. But it is to be understood that the invention includes modifications in certain details of the improved mechanism as will hereinafter be explained.

In order that the invention may be clearly understood the mechanism relating thereto will now be described with the aid of the accompanying drawings in which Figure 1 is a side view of a bicycle fitted with the improved propelling mechanism; Fig. 2 is a plan view of the said mechanism; Fig. 3 is a diagram designed to explain the mechanical advantage obtained by the use of the improved mechanism; Figs. 4, 5 and 6 illustrate details upon an enlarged scale.

As the improved mechanism is applied to each crank and pedal in precisely the same way, it will be sufficient to describe the application of the said mechanism to only one crank and pedal. Referring to the drawings Fig. 1 shows an ordinary bicycle having cranks 1, 2, crank pins 3, 4 and pedals 5, 6, mounted upon the said crank pins respectively. With the improved propelling mechanism according to this invention the pedal 5 mounted upon crank pin 3 has an elongated front portion 7 and a heel kerb 7′ to prevent the foot from slipping forward and, in the form shown, a clutch rod 8 journaled at one end upon the boss of the pedal 5 mounted on the said crank pin 3 and situated between the pedal 5 and the outer face of the crank 1, the clutch rod 8 being formed for this purpose with an enlarged lower end terminating in, or having attached thereto, a ring or ball race 9 concentric with the crank pin 3. The small or upper end of the clutch rod 8 terminates in a ring or ball race 10 adapted to work between the jaws of the forked end 11 of a radius rod 12 to which the said clutch rod is pivotally connected by a pin 13 passing through holes in the jaws of the forked end 11 of the radius rod and through the ring 10 at the small upper end of the clutch rod 8; the other end of the radius rod 12 is preferably forked (see Figs. 2 and 6) and pivoted at 14 upon a projection 15 fitted with a socket adapted to be detachably fixed to the corresponding side of the back fork of the machine.

On the inner side of the heel portion 7′ of the pedal 5 an inwardly extending projection 16 is provided, so arranged as to clear the crank arm 1 as this revolves but adapted to engage an outwardly projecting pin 17 arranged for this purpose upon the clutch rod 8 every time the crank arm 1 approaches its top center. As an alternative arrangement, clutch projections 18 (Figs. 4 and 5) may be provided upon the inner side of the pedal 5 adapted to engage counterpart clutch projections 19 provided upon rim 9 of the lower end of the clutch rod 8. The effect of this engagement between the projection 16 on the pedal 5 and the pin 17 or the clutch projections 18 and 19 is that the pedal is locked to the clutch rod and assumes the angular velocity of the clutch rod as distinguished from being clutched directly to the crank pin 3.

In operation, if the crank 1 is at its top center as described above, the lateral projection 16 on the pedal 5 is in contact with the pin 17 on the clutch rod 8 and the pedal is consequently locked to the clutch rod. By pressing with the foot on the front edge of the part 7 of the pedal the lock is maintained until the crank has passed beyond the lower dead center. It will be seen that when the crank reaches its bottom center (Fig. 1) there still remains a certain amount of leverage wherewith the rider can force the crank past the dead center, and at the same time the other crank 2 and its pedal 6 locked to the corresponding clutch rod will have come into a position of effective leverage. As the crank 1 rises on its idle stroke the projection 16 on the pedal 5 automatically disengages from the pin 17 on the clutch rod 8 until the crank approaches its top center when the projection 16 on the pedal again engages the pin 17 on the clutch rod and the above cycle is repeated.

Referring to Fig. 3, V and H are vertical and horizontal center lines respectively through the axis of the crank shaft and 14 is an adjustable fixed point on the frame of bicycle.

The crank path is divided into a number of equal divisions at the points $a$, $b$, $c$, $d$, $e$ ... to $x$. The center line of the pedal from its axis to its forward extremity is indicated by the lines $aa'$, $bb'$, $cc'$ ... to $nn'$, for the downward or power stroke, and from $nn'$ $oo'$ $pp'$ ... to $ww'$ for the upward stroke. Some corresponding positions of the clutch rod are shown by the long diagonal lines $aa^4$, $cc^4$ ... to $ww^4$.

One end of the clutch rod is carried around by the crank pin, the other end is suitably pivoted to one end of a radius link at $a^4$ $c^4$ $e^4$ ... to $k^4$, the other end of which works upon the fixed point 14 as in the form of construction described above and illustrated in Figs. 1, 2 and 4 to 6.

When the crank is on the top center the pedal is horizontally disposed at $aa'$ and the pedal and rod are now in rigid contact, the angle between the rod and pedal being constant throughout the downward stroke when exerting the maximum force. This angle is indicated by the dotted arc $a^5$ $a'$ at the commencement of the stroke and by $o^5$ $o'$ toward the end of the power stroke, after which the pedal is free to assume a less angle if required by the foot, shown approximately by the dotted lines $ss'$, $uu'$ ... to $ww'$ until the pedal is again under the control of the clutch rod to commence another power stroke.

It will be observed that during the up stroke the pedal is also shown by full lines $nn'$ $oo'$ $ss'$ ... to $ww'$; these full lines show the inclination the pedal would have if constrained to move as one integral piece with the clutch rod, or in permanent contact with the pin 17 on the clutch rod.

The curves in the diagram are found as follows:—Assuming the angular velocity of the crank to be uniform about its axis and represented by its radius length then the lower and varying angular velocity of the pedal about its axis can be represented by a proportionate part of its length for each position of the crank.

Taking the position of the crank $Cj$ for illustration; $Cj$ will represent the velocity of the crank in the circle; $jj^3$ shows the length of the pedal which is effectually added to the crank at that instant because the linear velocity of the pedal is less than that of the crank in the proportion shown. The dotted line $Cj^2$ therefore represents the velocity of the extremity of the pedal at $j'$ about the center C at that particular instant. A curve drawn through the points $e^3$ $f^3$ $g^3$ $h^3$ $i^3$ $j^3$ ... to $n^3$ shows the increase of leverage due to the instantaneous bell cranks $Cgg^3$ $Chh^3$ $Cii^3$ $Cjj^3$ ... to $Cnn^3$ obtained as above and these bell cranks have a potential angle (in respect of a downward force) which increases in relation to the crank as the crank revolves on its power stroke.

As the force is applied normal to the pedal (or arm of the instantaneous bell crank) this force will act in the direction of the line $j^2$ $j^2$ and meet the center line of its crank arm in the point $j^2$. Therefore the effective length of the crank is $Cj^2$ when the power is applied at the end of the pedal $j'$.

This shows an advantage compared with applying the same force to the original crank pin at $j$ or by applying a correspondingly reduced force at $j'$ for the same power.

By drawing a curve through the several points $e^2$ $f^2$ $g^2$ $h^2$ $i^2$, ... $n^2$ found in this way for each position of the crank it is possible to measure the effective length of the crank at any intermediate position.

In the above described arrangement the projection 16 on the pedal 5 takes the place of the free wheel clutch, and the clutch rod being centered on the crank pin takes the place of the eccentric and rod employed in the arrangement described in the former patent hereinabove referred to, the present arrangement being considerably simplified relatively to the said former arrangement and affording means for adjusting the angular movement of the pedal to suit the requirements of the rider. For example, by moving point 14 nearer to the vertical center V V (Fig. 3) the range of the pedal is increased, while by moving point 14 farther away from the vertical center V V the said range can be diminished. Also by raising the point 14 the pedal at the commencement of the stroke is inclined below the horizontal and by lowering the point 14 the pedal at the commencement of the stroke is inclined above the horizontal without altering the range. Again, by shortening or lengthening the radius rod 12 the angle of the pedal can be altered for commencement of the stroke and by a combination of these adjustments the most effective position can be obtained without difficulty.

It is evident that the present invention is not limited to the details hereinabove described as the improved mechanism is susceptible of various modifications of details without thereby altering the essential characteristics of the mechanism. The outer end of the clutch rod could be controlled by curved or straight guides angularly adjustable and fixed to the frame of the machine, thus dispensing with radius links.

In some cases it may be possible to make the clutch rod and pedal one integral piece, and dispense with any kind of clutch, the outer end being guided in a suitable and adjustable fixed path, the object being to make the gear as simple and direct as possible and at the same time to enable more leverage to be obtained for a given length of crank when traveling up an incline or propelling against wind resistance. This modification is applicable when no back pedal brake is applied, or when it is not intended to mount the machine from the pedal.

What I claim and desire to secure by Letters Patent is:—

1. Mechanism for propelling a bicycle comprising a driving crank, a crank pin secured thereto, a pedal mounted on the crank pin having an elongated front portion, a clutch rod rotatably mounted at one end upon the crank pin axis, means for constraining the other end of the clutch rod to move in a predetermined path, and means for causing the pedal to engage with the clutch rod during one part and to disengage therefrom automatically during another part of a revolution of the crank.

2. Mechanism for propelling a bicycle comprising a driving crank, a crank pin secured thereto, a pedal mounted on the crank pin having an elongated front portion, a clutch rod rotatably mounted at one end upon the crank pin axis, a radius rod pivoted to an adjustably fixed point on the frame of the machine, a pivotal connection between the free end of the clutch rod and of the radius rod, and means for causing the pedal to engage with the clutch rod during the driving stroke of the crank and to disengage therefrom during the idle stroke of the crank.

3. Mechanism for propelling a bicycle comprising a driving crank, a crank pin secured thereto, a pedal mounted on the crank pin, a clutch rod rotatably mounted at one end upon the crank pin axis, means for constraining the other end of the clutch rod to move in a predetermined path and a lost motion clutch device for clutching the pedal to the clutch rod during a fraction of each driving stroke of the crank.

4. Mechanism for propelling a bicycle comprising a driving crank, a crank pin secured thereto, a pedal mounted on the crank pin, a clutch rod and a pedal formed as one integral piece, and means for constraining the other end of the clutch rod to move in a predetermined path.

5. Mechanism for propelling a bicycle comprising a driving crank, a crank pin secured thereto, a pedal mounted on the crank pin, a boss on the pedal, a clutch rod mounted at one end upon the pedal boss, a fixed curved guide of any suitable radius length, including infinity for the other end of the clutch rod secured to the frame of the machine, means for angularly adjusting the fixed guide in the plane of the driving crank, and means for clutching the pedal to the clutch rod.

In witness whereof I have hereunto signed my name in the presence of two subscribing witnesses.

ARTHUR BOYD.

Witnesses:
JOHN WILLIAM WALTON,
FREDERICK CORNER.